United States Patent
Nakao et al.

(10) Patent No.: US 10,997,937 B2
(45) Date of Patent: May 4, 2021

(54) DISPLAY DEVICE

(71) Applicant: Japan Display Inc., Tokyo (JP)

(72) Inventors: Takayuki Nakao, Tokyo (JP); Takehiro Shima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/742,500

(22) Filed: Jan. 14, 2020

(65) Prior Publication Data

US 2020/0226996 A1    Jul. 16, 2020

(30) Foreign Application Priority Data

Jan. 16, 2019 (JP) .............................. JP2019-005327

(51) Int. Cl.
*G09G 3/36* (2006.01)

(52) U.S. Cl.
CPC ... *G09G 3/3677* (2013.01); *G09G 2310/0202* (2013.01)

(58) Field of Classification Search
CPC combination set(s) only.
See application file for complete search history.

(56) References Cited

U.S. PATENT DOCUMENTS

| 9,384,712 B2* | 7/2016 | Teranishi | G09G 3/3607 |
|---|---|---|---|
| 2002/0057266 A1* | 5/2002 | Miyajima | G09G 3/3648 |
| | | | 345/204 |
| 2009/0027325 A1* | 1/2009 | Kim | G02F 1/134336 |
| | | | 345/92 |
| 2010/0182522 A1* | 7/2010 | Woo | G02F 1/134636 |
| | | | 349/37 |
| 2013/0120670 A1* | 5/2013 | Chen | G02F 1/133753 |
| | | | 348/792 |
| 2014/0204296 A1 | 7/2014 | Mitsui et al. | |
| 2016/0363807 A1 | 12/2016 | Mitsui et al. | |

FOREIGN PATENT DOCUMENTS

JP   2014142502 A   8/2014

* cited by examiner

*Primary Examiner* — William Boddie
*Assistant Examiner* — Alecia D English
(74) *Attorney, Agent, or Firm* — K&L Gates LLP

(57) ABSTRACT

According to an aspect, a display device includes: two pixels having different areas; a first signal line extending in an arrangement direction of the two pixels and coupled to one of the two pixels; a second signal line extending in the arrangement direction and coupled to the other of the two pixels; and a scan line extending between the two pixels in an intersection direction intersecting the arrangement direction and coupled to the two pixels.

11 Claims, 10 Drawing Sheets

DISPLAY DEVICE

CROSS-REFERENCE TO RELATED APPLICATIONS

This application claims priority from Japanese Application No. 2019-005327, filed on Jan. 16, 2019, the contents of which are incorporated by reference herein in its entirety.

BACKGROUND

1. Technical Field

The present disclosure relates to a display device.

2. Description of the Related Art

A display device described in Japanese Patent Application Laid-open Publication No. 2014-142502 (JP-A-2014-142502) is known as a display device provided with a scan line in each pixel row.

The display device described in JP-A-2014-142502 is demanded to be reduced in number of scan lines with respect to the number of pixels to reduce the overall device size.

For the foregoing reasons, there is a need for a display device capable of operating with a smaller number of scan lines.

SUMMARY

According to an aspect, a display device includes: two pixels having different areas; a first signal line extending in an arrangement direction of the two pixels and coupled to one of the two pixels; a second signal line extending in the arrangement direction and coupled to the other of the two pixels; and a scan line extending between the two pixels in an intersection direction intersecting the arrangement direction and coupled to the two pixels.

According to another aspect, a display device includes: a first potential line configured to supply a first display signal; a second potential line configured to supply a second display signal; and first and second pixels configured to receive the signals supplied from the first and second potential lines to display an image. The first pixel includes a first pixel electrode, a first latch circuit configured to hold a pixel signal, and a first selection switch circuit configured to couple either one of the first potential line and the second potential line to the first pixel electrode in accordance with the pixel signal that is output from the first latch circuit. The second pixel includes a second pixel electrode, a second latch circuit configured to hold a pixel signal, and a second selection switch circuit configured to couple either one of the first potential line and the second potential line to the second pixel electrode in accordance with the pixel signal that is output from the second latch circuit. The first selection switch circuit and the second selection switch circuit are configured such that a potential line to be coupled to the first pixel electrode and a potential line to be coupled to the second pixel electrode are opposite to each other with respect to the pixel signals having the same value.

DETAILED DESCRIPTION

Figure 1:
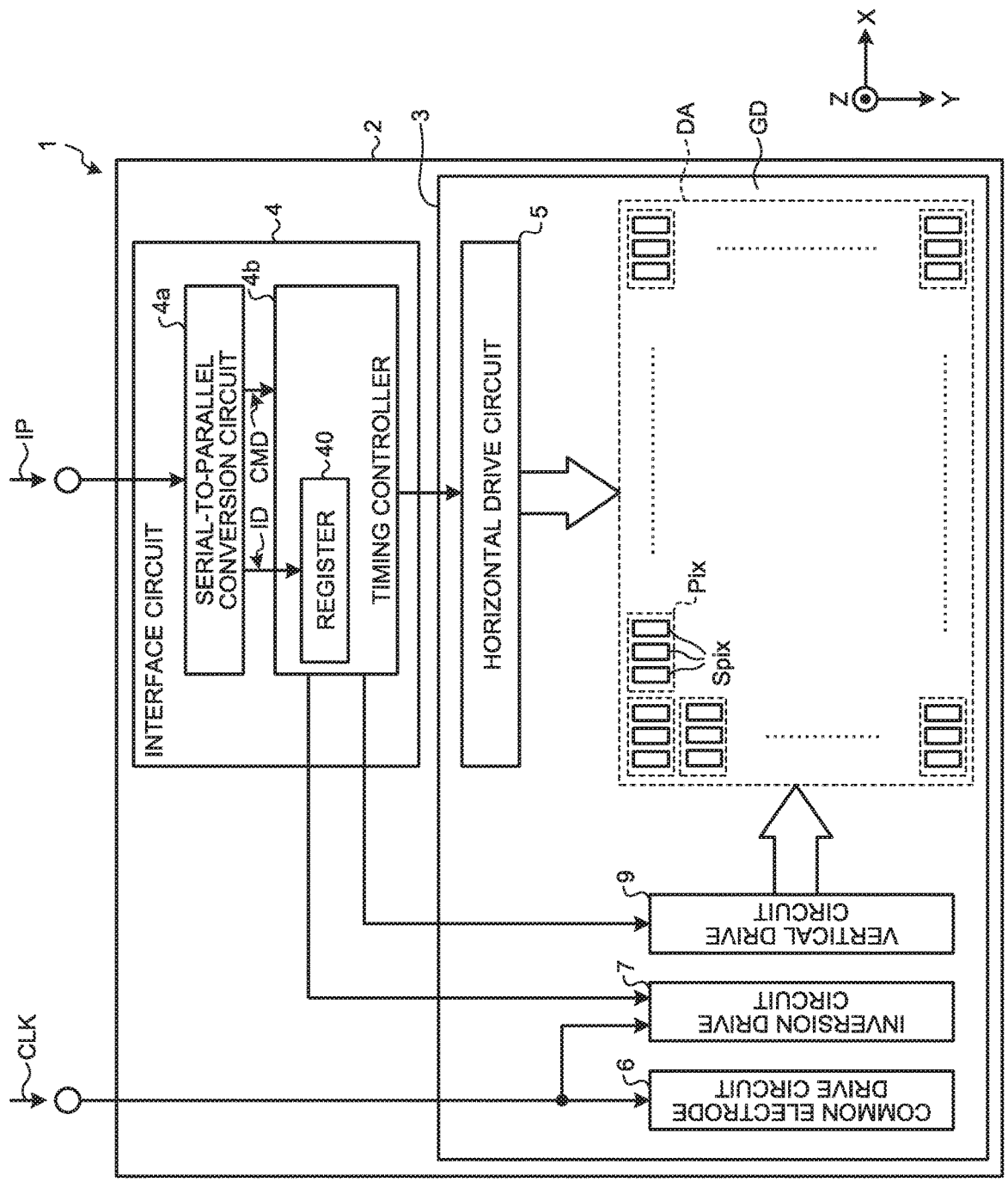
FIG. 1 is a diagram illustrating an overview of an overall configuration of a display device according to an embodiment.

The following describes an embodiment of the present invention with reference to the drawings. The disclosure is merely an example, and the present invention naturally encompasses appropriate modifications easily conceivable by those skilled in the art while maintaining the gist of the invention. To further clarify the description, widths, thicknesses, shapes, and the like of various parts are schematically illustrated in the drawings as compared with actual aspects thereof, in some cases. However, they are merely examples, and interpretation of the present invention is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

FIG. 1 is a diagram illustrating an overview of an overall configuration of a display device 1 according to an embodiment. The display device 1 includes a first panel 2 and a second panel 3 disposed so as to face the first panel 2. The display device 1 has a display area DA that displays an image and a frame area GD outside the display area DA. In the display area DA, liquid crystal 30 is sealed between the first panel 2 and the second panel 3 (refer to FIG. 2).

A plurality of pixels Pix are arranged in a matrix (in a row-column configuration) in the display area DA. The pixels Pix are arranged along an X-direction and a Y-direction in the display area DA. The X-direction is a direction parallel to principal surfaces of the first panel 2 and the second panel 3. The Y-direction is a direction parallel to the principal surfaces of the first panel 2 and the second panel 3, and intersecting the X-direction.

An interface circuit 4, a horizontal drive circuit 5, a common electrode drive circuit 6, an inversion drive circuit 7, and a vertical drive circuit 9 are disposed in the frame area GD. A configuration can be employed in which some components (for example, the horizontal drive circuit 5, the common electrode drive circuit 6, and the inversion drive circuit 7) of the above-listed circuits are incorporated in one integrated circuit (IC) chip, and the other components (for example, the vertical drive circuit 9) are provided on the first panel 2. Alternatively, a configuration can be employed in which the group of the circuits incorporated in the IC chip is provided in a processor outside the display device 1, and the circuits are coupled to the display device 1.

Each of the pixels Pix arranged in the matrix in the display area DA includes a plurality of sub-pixels Spix. While, in the present embodiment, the sub-pixels Spix are three sub-pixels: a red (R) sub-pixel, a green (G) sub-pixel, and a blue (B) sub pixel, the present disclosure is not limited thereto. The sub-pixels Spix may be four sub-pixels including a white (W) sub-pixel in addition to the red (R), green (G), and blue (B) sub-pixels. Alternatively, the sub-pixels Spix may be five or more sub-pixels or two or less sub-pixels of different colors. The configuration of the pixel Pix is not limited to that for what is called color display output, and may be that for supporting what is called black-and-white display output based on the level of luminance. In the case of the black-and-white display, the pixel Pix is provided with one component identical to each of the sub-pixels Spix. In this case, a color filter 22 (to be described later) is not present.

The interface circuit 4 includes a serial-to-parallel conversion circuit 4a and a timing controller 4b. The timing controller 4b includes a register 40. The serial-to-parallel conversion circuit 4a is serially supplied with an input signal IP including command data CMD and image data ID from an external circuit. While examples of the external circuit include a host central processing unit (CPU) and an application processor, the present disclosure is not limited thereto.

The serial-to-parallel conversion circuit 4a converts the image data ID included in the input signal IP into parallel data, and outputs the parallel data to the register 40. The serial-to-parallel conversion circuit 4a also outputs the command data CMD included in the input signal IP to the timing controller 4b. The timing controller 4b controls operations of the horizontal drive circuit 5, the inversion drive circuit 7, and the vertical drive circuit 9.

The common electrode drive circuit 6 and the inversion drive circuit 7 are components for a common inversion drive method. The common electrode drive circuit 6 and the inversion drive circuit 7 are supplied with a reference clock signal CLK from an external circuit. While examples of the external circuit include a clock generator, the present disclosure is not limited thereto.

Under the control of the timing controller 4b, the vertical drive circuit 9 outputs a scan signal for selecting a particular pixel row in the display area DA. Under the control of the timing controller 4b, the horizontal drive circuit 5 outputs a pixel signal to each of the pixels included in the pixel row selected by the scan signal.

Figure 2:
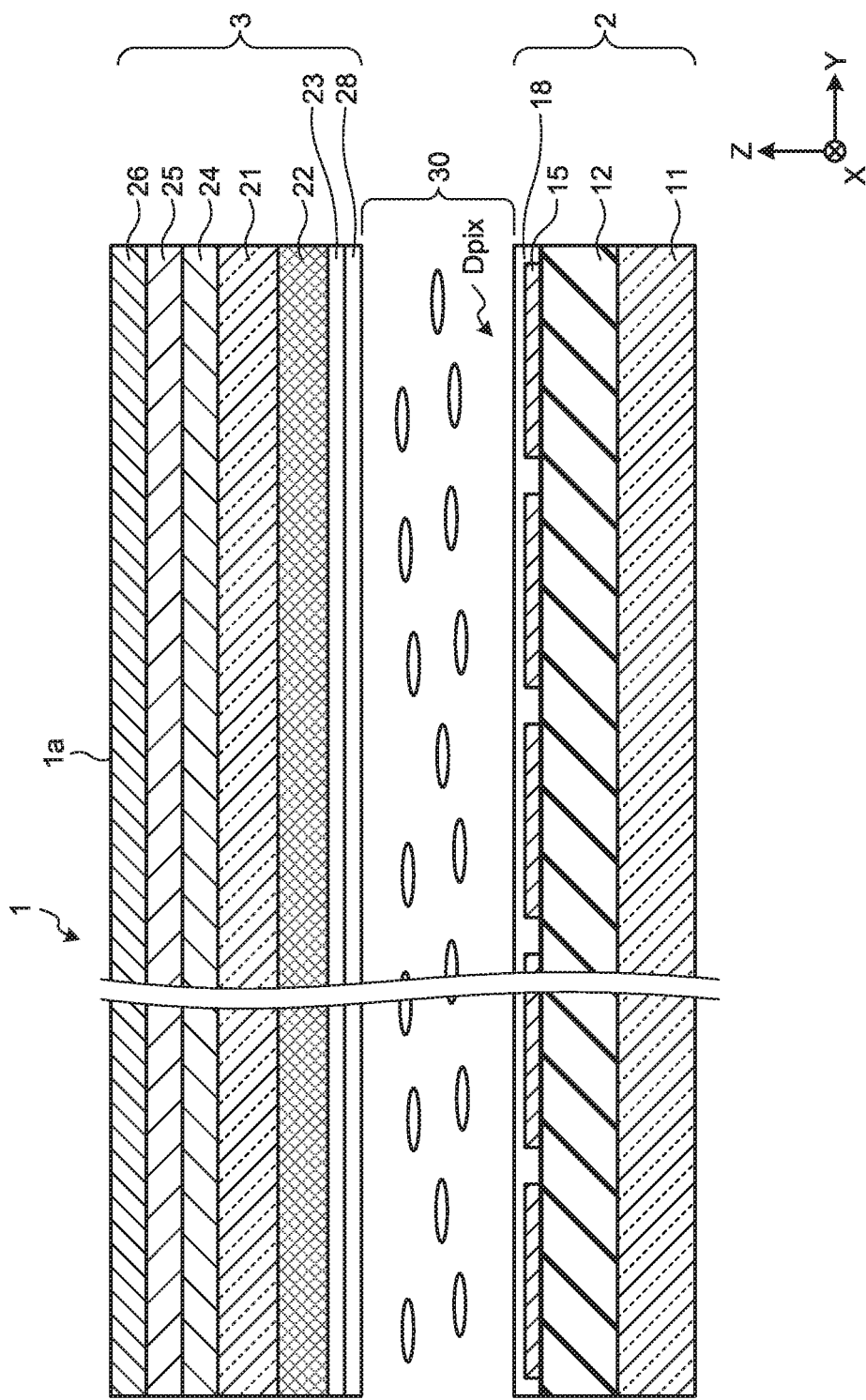
FIG. 2 is a sectional view of the display device according to the embodiment.

FIG. 2 is a sectional view of the display device 1 according to the present embodiment. As illustrated in FIG. 2, the display device 1 includes the first panel 2, the second panel 3, and the liquid crystal 30. The second panel 3 is disposed so as to face the first panel 2. The liquid crystal 30 is provided between the first panel 2 and the second panel 3. A surface serving as the principal surface of the second panel 3 serves as a display surface 1a for displaying an image.

Light incident from outside the display surface 1a is reflected by a pixel electrode 15 of the first panel 2, and exits from the display surface 1a. The display device 1 of the present embodiment is a reflective liquid crystal display device that uses this reflected light to display an image on the display surface 1a. A direction orthogonal to the X-direction and the Y-direction is referred to as a Z-direction herein.

The first panel 2 includes a first substrate 11, an insulating layer 12, the pixel electrode 15, and an orientation film 18. Examples of the first substrate 11 include a glass substrate and a resin substrate. A surface of the first substrate 11 is provided with circuit elements and various types of wiring, such as gate lines and data lines, which are not illustrated. The circuit elements include switching elements, such as thin-film transistors (TFTs), and capacitive elements.

The insulating layer 12 is provided above the first substrate 11, and planarizes surfaces of, for example, the circuit elements and the various types of wiring as a whole. A plurality of the pixel electrodes 15 are provided above the insulating layer 12. The orientation film 18 is provided between the pixel electrodes 15 and the liquid crystal 30. The pixel electrodes 15 are provided, one for each of the sub-pixels Spix. The pixel electrodes 15 are made of a metal, such as aluminum (Al) or silver (Ag). The pixel electrodes 15 may have a configuration laminated with these metal materials and a light-transmitting conductive material, such as indium tin oxide (ITO). The pixel electrodes 15 are made using a material having good reflectance, and serve as reflective plates that diffusely reflect the light incident from the outside.

The light reflected by the pixel electrodes 15 travels in a uniform direction toward the display surface 1a. At this time, a change in level of a voltage applied to each of the pixel electrodes 15 changes a transmission state of the light in the liquid crystal 30 above the pixel electrode 15, that is, the transmission state of the light of each of the sub-pixels Spix.

The second panel 3 includes a second substrate 21, the color filter 22, a common electrode 23, an orientation film 28, a ¼ wavelength plate 24, a ½ wavelength plate 25, and a polarizing plate 26. One of both surfaces of the second substrate 21 facing the first panel 2 is provided with the color filter 22 and the common electrode 23 in this order. The orientation film 28 is provided between the common electrode 23 and the liquid crystal 30. A surface of the second substrate 21 facing the display surface 1a is provided with the ¼ wavelength plate 24, the ½ wavelength plate 25, and the polarizing plate 26 that are stacked in this order.

Examples of the second substrate 21 include a glass substrate and a resin substrate. The common electrode 23 is made of a light-transmitting conductive material, such as ITO. The common electrode 23 is disposed so as to face the pixel electrodes 15, and supplies a common potential to each of the sub-pixels Spix. The color filter 22 includes filters having, for example, three colors: red (R), green (G), and blue (B), but the present disclosure is not limited to this example.

The liquid crystal 30 includes, for example, nematic liquid crystal. A change in level of a voltage between the common electrode 23 and the pixel electrode 15 changes an orientation state of liquid crystal molecules of the liquid crystal 30 located therebetween. As a result, the light passing through the liquid crystal 30 is modulated on a per sub-pixel Spix basis.

For example, outside light serves as the light incident from the display surface 1a of the display device 1, and reaches the pixel electrodes 15 through the second panel 3 and the liquid crystal 30. The incident light is reflected on the pixel electrodes 15 of the sub-pixels Spix. The reflected light is modulated on a per sub-pixel Spix basis and exits from the display surface 1a. Thus, the image is displayed.

Figure 3:
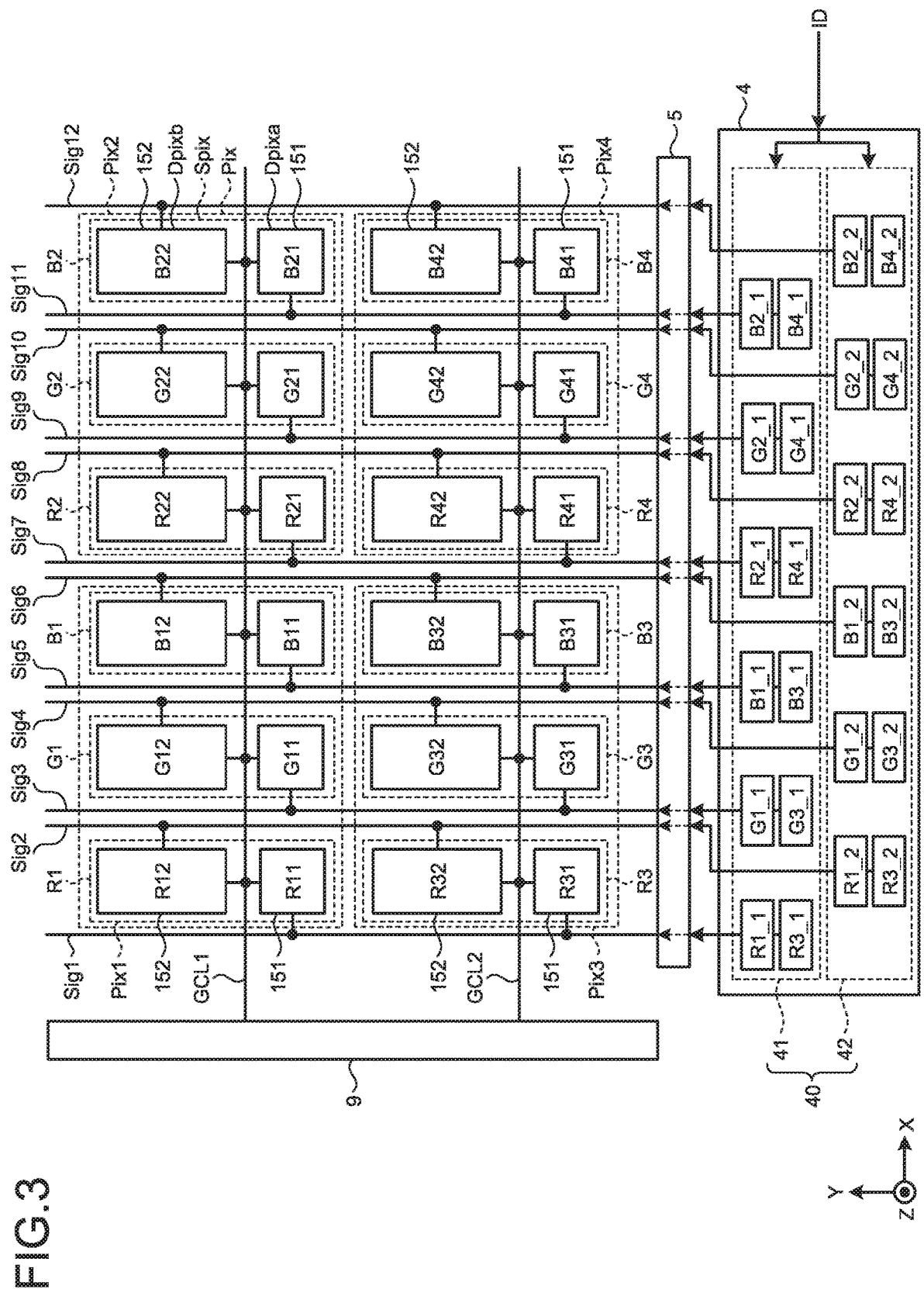
FIG. 3 is a diagram schematically illustrating relations between components included in pixels, scan lines, signal lines, and signals supplied to the signal lines according to the embodiment.

FIG. 3 is a diagram schematically illustrating relations between components included in the pixels Pix, scan lines GCL, signal lines Sig, and signals supplied to the signal lines Sig according to the present embodiment.

A pixel Pix1 includes a first sub-pixel R1, a second sub-pixel G1, and a third sub-pixel B1. The first sub-pixel R1, the second sub-pixel G1, and the third sub-pixel B1 differ in arrangement, in the signal lines Sig coupled thereto, and in color of the color filter 22, and are the same in other configurations. A red (R) color filter 22 is disposed for the first sub-pixel R1. A green (G) color filter 22 is disposed for the second sub-pixel G1. A blue (B) color filter 22 is disposed for the third sub-pixel B1.

The first sub-pixel R1 includes a first divided pixel R11 and a second divided pixel R12. The second sub-pixel G1 includes a first divided pixel G11 and a second divided pixel G12. The third sub-pixel B1 includes a first divided pixel B11 and a second divided pixel B12.

The first divided pixel R11, the first divided pixel G11, and the first divided pixel B11 are each a first divided pixel Dpixa. The second divided pixel R12, the second divided pixel G12, and the second divided pixel B12 are each a second divided pixel Dpixb. The ratio between the size of a pixel electrode 151 of the first divided pixel Dpixa and the size of a pixel electrode 152 of the second divided pixel Dpixb is 1:2 ($2^0:2^1$). The pixel electrode 151 and the pixel electrode 152 are the pixel electrodes 15 having different sizes from each other.

The sub-pixel Spix including the first divided pixel Dpixa and the second divided pixel Dpixb is capable of multi-gradation output by what is called area coverage modulation. A state in which both the first divided pixel Dpixa and the second divided pixel Dpixb are controlled to reflect light is the brightest state. A state in which only the second divided pixel Dpixb is controlled to reflect light is the second brightest state. A state in which only the first divided pixel Dpixa is controlled to reflect light is the third brightest state. A state in which both the first divided pixel Dpixa and the second divided pixel Dpixb are controlled not to reflect light is the darkest state. The ratio between reflection areas of the above-described states is 4:2:1:0 ($2^2:2^1:2^0:0$), where the numbers are arranged in the order of the description. The first divided pixel Dpixa and the second divided pixel Dpixb may each be called a divided pixel Dpix when not distinguished from each other (refer to FIG. 2).

The above has described the components included in the pixel Pix1. The same applies to a pixel Pix2, a pixel Pix3, and a pixel Pix4.

In FIG. 3, In FIG. 3, symbols of the pixels Pix, the sub-pixels Spix, the first divided pixels Dpixa, and the second divided pixels Dpixb are assigned to illustrate relations therebetween. Although the symbols are not individually described, the pixels Pix1 to Pix4 are the pixels Pix; first sub-pixels R1 to R4, second sub-pixels G1 to G4, and third sub-pixels B1 to B4 are the sub-pixels Spix; first divided pixels R11 to R41, first divided pixels G11 to G41, and first divided pixels B11 to B41 are the first divided pixels Dpixa; and second divided pixels R12 to R42, second divided pixels G12 to G42, and second divided pixels B12 to B42 are the second divided pixels Dpixb.

As described above, each of the pixels Pix includes three of the sub-pixels Spix. Each of the sub-pixels Spix includes the first divided pixel Dpixa and the second divided pixel Dpixb.

The pixels Pix are arranged in a two-dimensional matrix. The pixels Pix1 and Pix2 illustrated in FIG. 3 are arranged in the X-direction. The pixels Pix3 and Pix4 are arranged in the X-direction. The pixels Pix1 and Pix3 are arranged in the Y-direction. The pixels Pix2 and Pix4 are arranged in the Y-direction.

In the present embodiment, the sub-pixels Spix included in each of the pixels Pix are arranged in the X-direction. Taking an example of the sub-pixels Spix included in the pixels Pix1 and Pix2, the first sub-pixel R1, the second sub-pixel G1, the third sub-pixel B1, the first sub-pixel R2, the second sub-pixel G2, and the third sub-pixel B2 are arranged in the X-direction.

The sub-pixels Spix of the same color included in the pixels Pix arranged in the Y-direction are arranged in the Y-direction. Taking an example of the sub-pixels Spix included in the pixels Pix1 and Pix3, the first sub-pixels R1 and R3 are arranged in the Y-direction; the second sub-pixels G1 and G3 are arranged in the Y-direction; and the third sub-pixels B1 and B3 are arranged in the Y-direction.

As illustrated in FIG. 3, the first divided pixel Dpixa and the second divided pixel Dpixb included in a single sub-pixel Spix of the sub-pixels Spix share one of the scan lines GCL. The sub-pixels Spix arranged in the same row share one of the scan lines GCL.

The first divided pixels Dpixa arranged in the Y-direction share one of the signal lines (first signal lines) Sig. The second divided pixels Dpixb arranged in the Y-direction share one of the signal lines (second signal lines) Sig. The signal lines Sig coupled to the first divided pixels Dpixa differ from the signal lines Sig coupled to the second divided pixels Dpixb. In the present embodiment, each pair of the signal lines Sig is provided on one side and the other side of the first divided pixels Dpixa and the second divided pixels Dpixb. However, a configuration can also be employed in which each pair of the signal lines Sig is provided together on one side of the divided pixels.

The scan lines GCL are coupled to the vertical drive circuit 9. The vertical drive circuit 9 outputs the scan signals to the respective scan lines GCL at different timing to drive the sub-pixels Spix row by row. The signal lines Sig are coupled to the horizontal drive circuit 5. The horizontal drive circuit 5 is interposed between the interface circuit 4 and the signal lines Sig. The horizontal drive circuit 5 outputs the pixel signals received from the interface circuit 4 to the signal lines Sig. The pixel signals are supplied to the first divided pixels Dpixa and the second divided pixels Dpixb that are driven according to the timing of the scan signals.

The interface circuit 4 includes the register 40. The register 40 stores therein the pixel signals. The register 40 includes a first register 41 and a second register 42. The first register 41 stores therein the pixel signals for the first divided pixels Dpixa. The second register 42 stores therein the pixel signals for the second divided pixels Dpixb. The first register 41 and the second register 42 serve as what is called a line buffer. The interface circuit 4 divides the pixel signals included in the image data ID into the pixel signals for the first divided pixels Dpixa and the pixel signals for the second divided pixels Dpixb, and stores the divided signals in the first register 41 and the second register 42, respectively.

Figure 4:
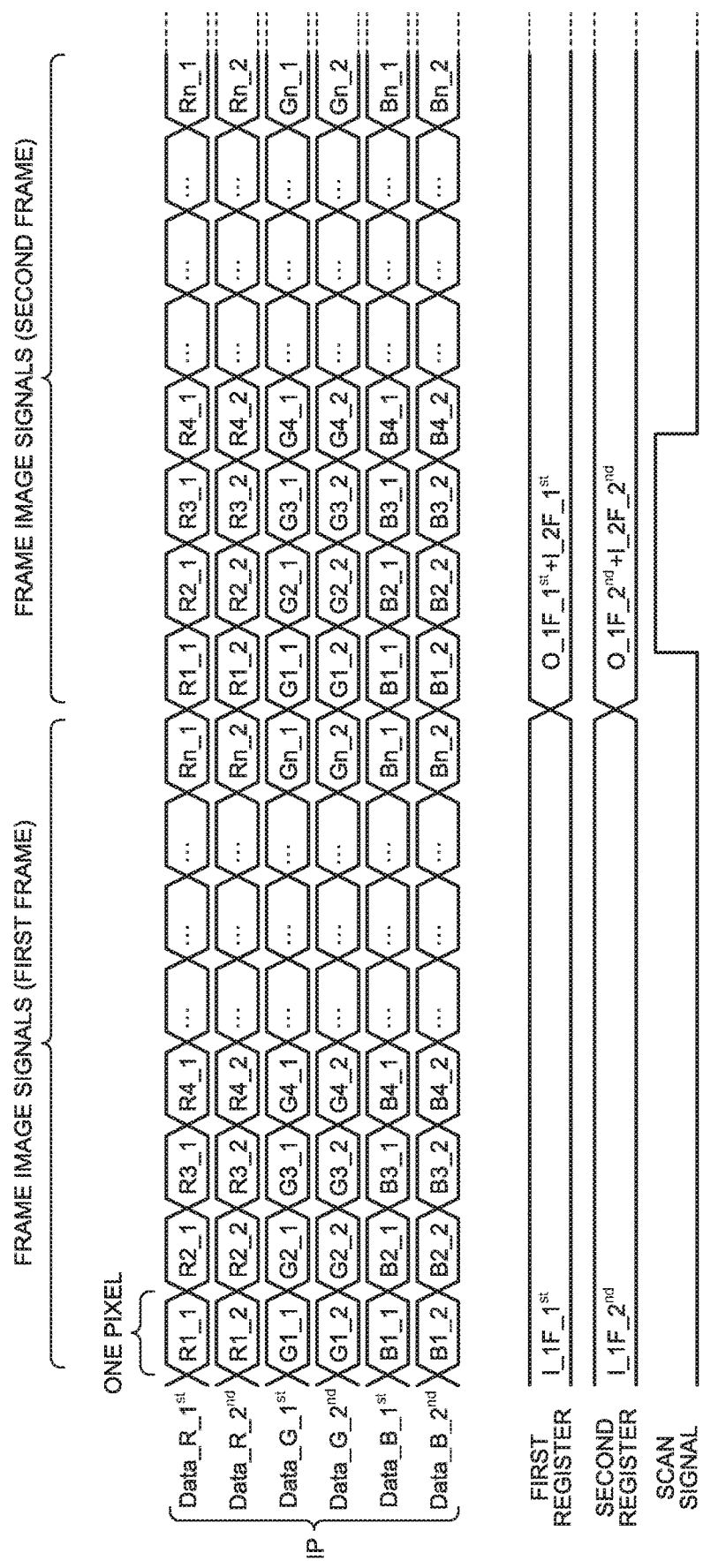
FIG. 4 is a diagram illustrating an example of a specific configuration of image data ID and data input/output in a first register and a second register.

FIG. 4 is a diagram illustrating an example of a specific configuration of the image data ID and data input/output in the first register 41 and the second register 42. The image data ID includes Data_R_$1^{st}$, Data_R_$2^{nd}$, Data_G_$1^{st}$, Data_G_$2^{nd}$, Data_B_$1^{st}$, and Data_B_$2^{nd}$. Data_R_$1^{st}$, Data_R_$2^{nd}$, Data_G_$1^{st}$, Data_G_$2^{nd}$, Data_B_$1^{st}$, and Data_B_$2^{nd}$ are supplied to the interface circuit 4 through different input terminals.

Each hexagon illustrated in each of the rows of Data_R_$1^{st}$, Data_R_$2^{nd}$, Data_G_$1^{st}$, Data_G_$2^{nd}$, Data_B_$1^{st}$, and Data_B_$2^{nd}$ serves as the pixel signal for one of the first divided pixels Dpixa or one of the second divided pixels Dpixb. The pixel signal is a one-bit signal. Six pixel signals arranged in the column direction in FIG. 4 are assigned to three first divided pixels Dpixa and three second divided pixels Dpixb included in one of the pixels Pix. Of the symbols assigned to the pixel signal, a symbol followed by an underscore (_) corresponds to a symbol for the sub-pixel Spix. If a symbol following the underscore (_) is 1, the pixel signal is assigned to the first divided pixel Dpixa. If the symbol following the underscore (_) is 2, the pixel signal is assigned to the second divided pixel Dpixb. For example, a pixel signal of "R1_1" is assigned to the first divided pixel R11 that is the first divided pixel Dpixa included in the first sub-pixel R1. A pixel signal of "R1_2" is assigned to the second divided pixel R12 that is the second divided pixel Dpixb included in the first sub-pixel R1.

An expression "frame image signals" in FIG. 4 indicates that an image displayed using the n pixels Pix provided in the matrix in the display area DA is a frame image updated at a predetermined period (at predetermined frames per second).

After frame image signals of the first frame are received through input of the image data ID, the register 40 stores therein the frame image signals. The pixel signals of Data_R_$1^{st}$, Data_G_$1^{st}$, and Data_B_$1^{st}$ are stored in the first register 41. The pixel signals of Data_R_$2^{nd}$, Data_G_$2^{nd}$, and Data_B_$2^{nd}$ are stored in the second register 42. In FIG. 4, "I_1F_$1^{st}$" denotes a period in which the first register 41 stores therein the pixel signals of Data_R_$1^{st}$, Data_G_$1^{st}$, and Data_B_$1^{st}$ during the first frame period, and "I_1F_$2^{nd}$" denotes a period in which the second register 42 stores therein the pixel signals of Data_R_$2^{nd}$, Data_G_$2^{nd}$, and Data_B_$2^{nd}$ during the first frame period.

The interface circuit 4 outputs the pixel signals from the first register 41 and the second register 42 so as to transmit the pixel signals to the first divided pixels Dpixa and the second divided pixels Dpixb according to the timing of the scan signal from the vertical drive circuit 9. The pixel signals are transmitted to the first divided pixels Dpixa and the second divided pixels Dpixb through the horizontal drive circuit 5 and the signal lines Sig.

For example, the pixel signals of "R1_1", "G1_1", "B1_1", "R2_1", "G2_1", and "B2_1" output from the first register 41 are supplied to the first divided pixels Dpixa according to the timing of the scan signal to a scan line GCL1 illustrated in FIG. 3. The pixel signal of "R1_1" is transmitted through a signal line Sig1 to the first divided pixel R11. The pixel signal of "G1_1" is transmitted through a signal line Sig3 to the first divided pixel G11. The pixel signal of "B1_1" is transmitted through a signal line Sig5 to the first divided pixel B11. The pixel signal of "R2_1" is transmitted through a signal line Sig7 to the first divided pixel R21. The pixel signal of "G2_1" is transmitted through a signal line Sig9 to the first divided pixel G21. The pixel signal of "B2_1" is transmitted through a signal line Sig11 to the first divided pixel B21. Hereinafter, these signal lines Sig coupled to the first divided pixels Dpixa may be called the first signal lines.

The pixel signals of "R1_2", "G1_2", "B1_2", "R2_2", "G2_2", and "B2_2" output from the second register 42 are supplied to the second divided pixels Dpixb at the same timing. The pixel signal of "R1_2" is transmitted through a signal line Sig2 to the second divided pixel R12. The pixel signal of "G1_2" is transmitted through a signal line Sig4 to the second divided pixel G12. The pixel signal of "B1_2" is transmitted through a signal line Sigh to the second divided pixel B12. The pixel signal of "R2_2" is transmitted through a signal line Sig8 to the second divided pixel R22. The pixel signal of "G2_2" is transmitted through a signal line Sig10 to the second divided pixel G22. The pixel signal of "B2_2" is transmitted through a signal line Sig12 to the second divided pixel B22. Hereinafter, these signal lines Sig coupled to the second divided pixel Dpixb may be called the second signal lines.

Frame image signals of the second frame are received in parallel with the output of the frame image signals of the first frame. The register 40 stores therein the frame image signals of the second frame in parallel with the output of the frame image signals of the first frame. The pixel signals of Data_R_$1^{st}$, Data_G_$1^{st}$, and Data_B_$1^{st}$ are stored in the first register 41. The pixel signals of Data_R_$2^{nd}$, Data_G_$2^{nd}$, and Data_B_$2^{nd}$ are stored in the second register 42.

In FIG. 4, "O_1F_$1^{st}$+I_2F_$1^{st}$" denotes a period in which the first register 41 outputs the pixel signals received during the first frame period and stores therein the pixel signals of Data_R_$1^{st}$, Data_G_$1^{st}$, and Data_B_$1^{st}$ during the second frame period, and "O_1F_$2^{nd}$+I_2F_$2^{nd}$" denotes a period in which the second register 42 stores therein the pixel signals of Data_R_$2^{nd}$, Data_G_$2^{nd}$, and Data_B_$2^{nd}$.

The pixel signals of "R3_1", "G3_1", "B3_1", "R4_1", "G4_1", and "B4_1" output from the first register 41 are supplied to the first divided pixels Dpixa according to the timing of the scan signal to a scan line GCL2 illustrated in FIG. 3. The pixel signal of "R3_1" is transmitted through the signal line Sig1 to the first divided pixel R31. The pixel signal of "G3_1" is transmitted through the signal line Sig3 to the first divided pixel G31. The pixel signal of "B3_1" is transmitted through the signal line Sig5 to the first divided pixel B31. The pixel signal of "R4_1" is transmitted through the signal line Sig7 to the first divided pixel R41. The pixel signal of "G4_1" is transmitted through the signal line Sig9 to the first divided pixel G41. The pixel signal of "B4_1" is transmitted through the signal line Sig11 to the first divided pixel B41.

The pixel signals of "R3_2", "G3_2", "B3_2", "R4_2", "G4_2", and "B4_2" output from the second register 42 are supplied to the second divided pixels Dpixb at the same timing. The pixel signal of "R3_2" is transmitted through the signal line Sig2 to the second divided pixel R32. The pixel signal of "G3_2" is transmitted through the signal line Sig4 to the second divided pixel G32. The pixel signal of "B3_2" is transmitted through the signal line Sigh to the second divided pixel B32. The pixel signal of "R4_2" is transmitted through the signal line Sig8 to the second divided pixel R42. The pixel signal of "G4_2" is transmitted through the signal line Sig10 to the second divided pixel G42. The pixel signal of "B4_2" is transmitted through the signal line Sig12 to the second divided pixel B42.

The description with reference to FIGS. 3 and 4 specifically illustrates the example of the pixel signals supplied to the first divided pixels Dpixa and the second divided pixels Dpixb of the sub-pixels Spix included in the four exemplary pixels Pix: the pixel Pix1 to pixel Pix4. However, the pixel signals are not limited to them. The image data ID includes signals for the n pixels Pix provided in the display device 1.

Figure 5:
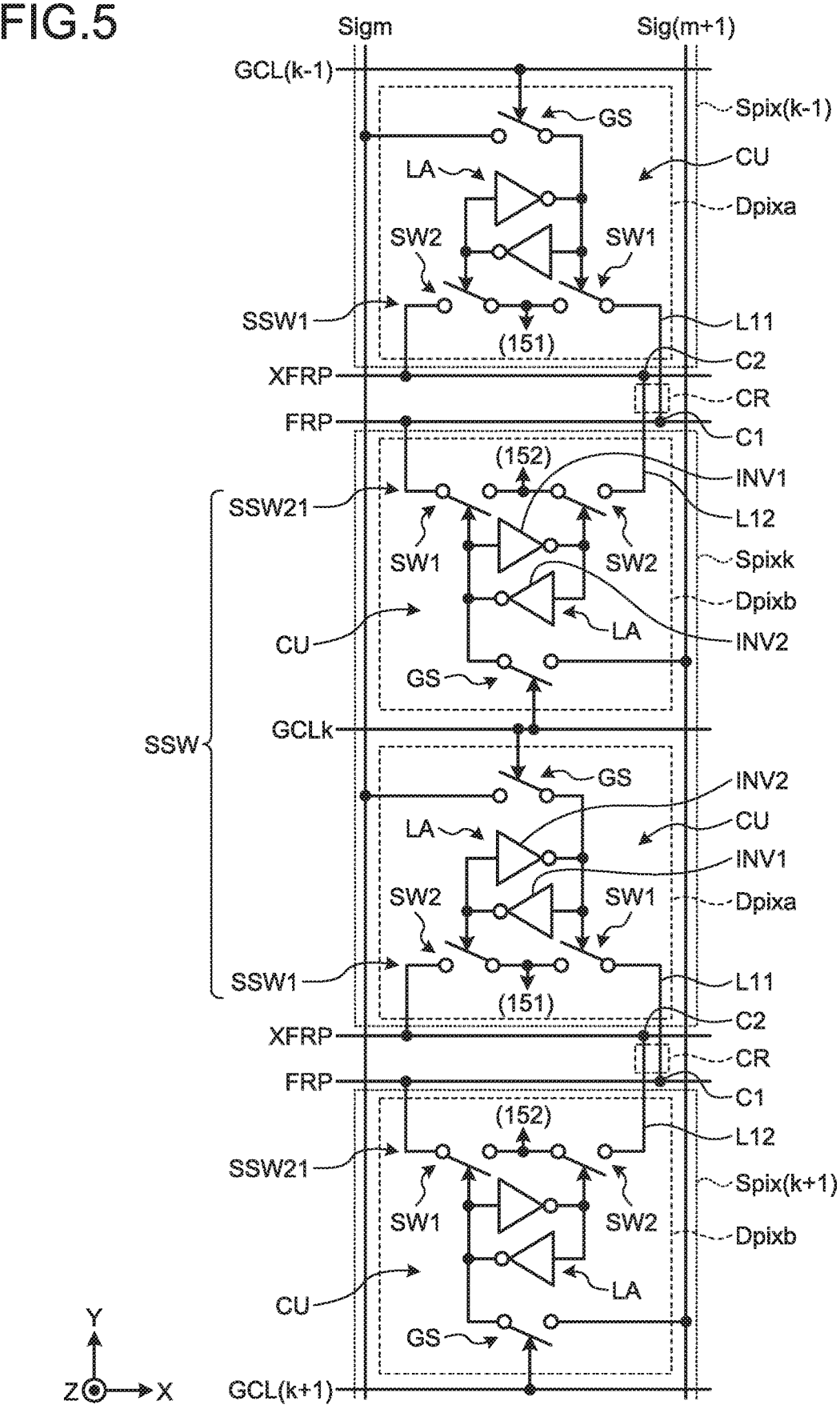
FIG. 5 is a diagram illustrating an example of a circuit configuration of first divided pixels and second divided pixels arranged in a Y-direction.

FIG. 5 is a diagram illustrating an example of a circuit configuration of the first divided pixels Dpixa and the second divided pixels Dpixb arranged in the Y-direction. A sub-pixel Spix(k−1), a sub-pixel Spixk, and a sub-pixel Spix(k+1) illustrated in FIG. 5 are three of the sub-pixels Spix arranged in the Y-direction. A scan line GCL(k−1), a scan line GCLk, and a scan line GCL(k+1) are three of the scan lines GCL arranged in the Y-direction. A signal line (first signal line) Sigm and a signal line (second signal line) Sig(m+1) are two of the signal lines Sig arranged so as to interpose the sub-pixel Spix(k−1), the sub-pixel Spixk, and the sub-pixel Spix(k+1) therebetween. The k and m represent natural numbers.

Each of the first divided pixels Dpixa and the second divided pixels Dpixb includes the pixel electrode 15 (refer to FIG. 2) and a pixel circuit CU coupled to the pixel electrode 15. The pixel electrode 151 serving as the pixel electrode 15 of the first divided pixel Dpixa differs from the pixel electrode 152 serving as the pixel electrode 15 of the second divided pixel Dpixb (refer to FIGS. 3 and 5). The pixel circuit CU includes a gate switch GS, a latch circuit LA, and a selection switch circuit SSW. The selection switch circuit SSW includes a first switch SW1 and a second switch SW2. The gate switch GS opens and closes a path between one of the signal lines Sig and the latch circuit LA in response to the scan signal supplied to the scan line GCL. The gate switch GS of the first divided pixel Dpixa opens and closes a path between the signal line Sigm and the latch circuit LA. The gate switch GS of the second divided pixel Dpixb opens and closes a path between the signal line Sig(m+1) and the latch circuit LA.

The gate switch GS couples the signal line Sig to the latch circuit LA in response to the scan signal supplied to the scan line GCL. As described above, the first divided pixel Dpixa and the second divided pixel Dpixb included in one of the sub-pixels Spix share one of the scan lines GCL. The first divided pixel Dpixa and the second divided pixel Dpixb included in the sub-pixel Spixk share the scan line GCLk.

The latch circuit LA holds a one-bit signal (positive/negative signal or 0/1 signal) supplied from the signal line Sig. More specifically, the latch circuit LA includes two complementary metal-oxide-semiconductor (CMOS) inverters, and the output of one of the CMOS inverters is coupled to the input of the other CMOS inverter. Both the CMOS inverters are coupled to a positive power supply line and a negative power supply line, which are not illustrated. Typical examples of the latch circuit LA include a static random access memory (SRAM). When a memory circuit for holding the pixel signal is treated as a configuration having the same function as the latch circuit LA, a configuration using a dynamic RAM (DRAM) can also be employed. The latch circuit LA of the first divided pixel Dpixa holds the one-bit signal supplied from the signal line Sigm. The latch circuit LA of the second divided pixel Dpixb holds the one-bit signal supplied from the signal line Sig(m+1).

The selection switch circuits SSW open and close paths extending from a first potential line FRP and a second potential line XFRP to the pixel electrodes 15. More specifically, the switch SW1 provided in a first selection switch circuit SSW1 serving as the selection switch circuit SSW of the first divided pixel Dpixa opens and closes a path between the first potential lines FRP and the pixel electrode 151, and the switch SW2 of the first selection switch circuit SSW1 opens and closes a path between the second potential lines XFRP and the pixel electrode 151. The switch SW1 provided in a second selection switch circuit SSW21 serving as the selection switch circuit SSW of the second divided pixel Dpixb opens and closes a path between the first potential line FRP and the pixel electrode 152, and the switch SW2 of the second selection switch circuit SSW21 opens and closes a path between the second potential line XFRP and the pixel electrode 152.

Both the switches SW1 and SW2 of the selection switch circuit SSW can be defined as follows from relations with the latch circuit LA. That is, the latch circuit LA includes a first inverter INV1 with an input end coupled to the gate switch GS and a second inverter INV2 with an input end coupled to an output end of the first inverter INV1, and the output end of the second inverter INV2 is coupled to the input end of the first inverter INV1. For such a latch circuit LA, the first switch SW1 of the selection switch circuit SSW is on-off controlled based on a signal supplied to the first inverter INV1, that is, an output from the second inverter INV2. The second switch SW2 is on-off controlled based on a signal output to the second inverter INV2, that is, an output from the first inverter INV1.

The switch SW1 and the switch SW2 operate in accordance with the one-bit signal held by the latch circuit LA. The operation of the switch SW1 and the operation of switch SW2 performed in accordance with the same one-bit signal (0 or 1) are opposite to each other. In other words, when the switch SW1 couples the first potential line FRP to the pixel electrode 15 in accordance with one value (for example, 0) of the one-bit signal held by the latch circuit LA, the switch SW2 uncouples the second potential line XFRP from the pixel electrode 15. In contrast, when the switch SW1 uncouples the first potential line FRP from the pixel electrode 15 in accordance with the other value (for example, 1) of the one-bit signal held by the latch circuit LA, the switch SW2 couples the second potential line XFRP to the pixel electrode 15. The control of the switches SW1 and SW2 of the selection switch circuit SSW can be said to be complementary.

The first potential line FRP and the second potential line XFRP transmit display signals of different potentials. A first display signal supplied to the first potential line FRP and a second display signal supplied to the second potential line XFRP are inverted by the inversion drive circuit 7 in synchronization with the reference clock signal CLK (refer to FIG. 1). The term "inverted" means that the potential of the display signal supplied to the potential line is periodically swung between different potentials, and typical examples include an alternating current (AC) having a certain amplitude and period. The second potential line XFRP has a display signal having a phase opposite to that of the first potential line FRP, and the first potential line FRP and the second potential line XFRP are always opposite to each other in phase of the potential.

The common potential supplied to the common electrode 23 (refer to FIG. 2) is inverted by the common electrode drive circuit 6 (refer to FIG. 1) in synchronization with the reference clock signal CLK.

A case will be exemplified where the first display signal is in phase with the common potential, and the second display signal is out of phase with (in opposite phase to) the common potential. When the switch SW1 couples the first potential line FRP to the pixel electrode 15, the first display signal in phase with the common potential is supplied to the pixel electrode 15. Therefore, no potential difference is produced between the common electrode 23 and the pixel electrode 15, and the liquid crystal molecules do not change in direction of orientation. As a result, a black display state (a state in which the reflected light from the pixel electrode 15 does not pass through the polarizing plate 26, and no color is displayed) is obtained. When the switch SW2 couples the second potential line XFRP to the pixel electrode 15, the second display signal out of phase with the common potential is supplied to the pixel electrode 15. Therefore, an electric field associated with the potential difference between the electrodes is generated in the liquid crystal 30 between the common electrode 23 and the pixel electrode 15, causing the liquid crystal molecules to change in direction of orientation. As a result, a white display state (a state in which the reflected light from the pixel electrode 15 passes through the color filter 22 and the polarizing plate 26, and colors are displayed) is obtained.

Driving methods such as a common inversion method, a column inversion method, a line inversion method, a dot inversion method, and a frame inversion method are known as driving methods for reducing burn-in of a screen of the liquid crystal display device. The display device 1 can employ any one of the above-listed driving methods. In the present embodiment, the display device 1 employs the common inversion driving method. The common electrode drive circuit 6 inverts the potential (common potential) of the common electrode 23 in synchronization with the reference clock signal CLK. The inversion drive circuit 7 inverts the potentials of the display signals (in the first potential line FRP and the second potential line XFRP) in synchronization with the reference clock signal CLK under the control of the timing controller 4b. In the present embodiment, the display device 1 is what is called a normally black liquid crystal display device that displays a black color when no voltage is applied to the liquid crystal 30 and displays a white color (or the color of the color filter 22) when a voltage is applied to the liquid crystal 30.

A configuration can also be employed in which the second display signal is in phase with the common potential, and the first display signal is in opposite phase to the common potential. In other words, the display device 1 may be what is called a normally white liquid crystal display device that displays a white color when no voltage is applied to the liquid crystal 30 and displays a black color when a voltage is applied to the liquid crystal 30. A configuration can also be employed in which the common potential and the potential of the first display signal are fixed potentials, and the second display signal is an AC signal.

The first potential lines FRP and the second potential lines XFRP each extend in the X-direction. One of the first potential lines FRP and one of the second potential lines XFRP are provided between two of the scan lines GCL adjacent to each other in the Y-direction.

The first divided pixel Dpixa included in one of two sub-pixels Spix adjacent to each other in the Y-direction and the second divided pixel Dpixb included in the other of the two sub-pixels Spix are adjacent to each other in the Y-direction, and share the first potential line FRP and the second potential line XFRP. The first divided pixel Dpixa of the sub-pixel Spix(k−1) and the second divided pixel Dpixb of the sub-pixel Spixk illustrated in FIG. 5 share the first potential line FRP and the second potential line XFRP provided between the scan line GCL(k−1) and the scan line GCLk.

The second potential line XFRP illustrated in FIG. 5 is located closer to the first divided pixel Dpixa than the first potential line FRP is. Therefore, wiring L11 extending from one end of the switch SW1 included in the first divided pixel Dpixa intersects the second potential line XFRP to reach a contact C1 in a plan view. The first potential line FRP illustrated in FIG. 5 is located closer to the second divided pixel Dpixb than the second potential line XFRP is. Therefore, wiring L12 extending from one end of the switch SW2 included in the second divided pixel Dpixb intersects the first potential line FRP to reach a contact C2 in a plan view. In this way, the circuit configuration illustrated in FIG. 5 forms a crossing portion CR of the wiring near the contact C1 and the contact C2.

The circuit configuration illustrated in FIG. 5 requires a space for providing a portion, for example, the crossing portion CR where the wiring L11 and L12 intersect and the contacts C1 and C2. Therefore, the first divided pixel Dpixa and the second divided pixel Dpixb are difficult to be miniaturized. In other words, the image in the display area DA is difficult to be increased in definition.

Figure 6:
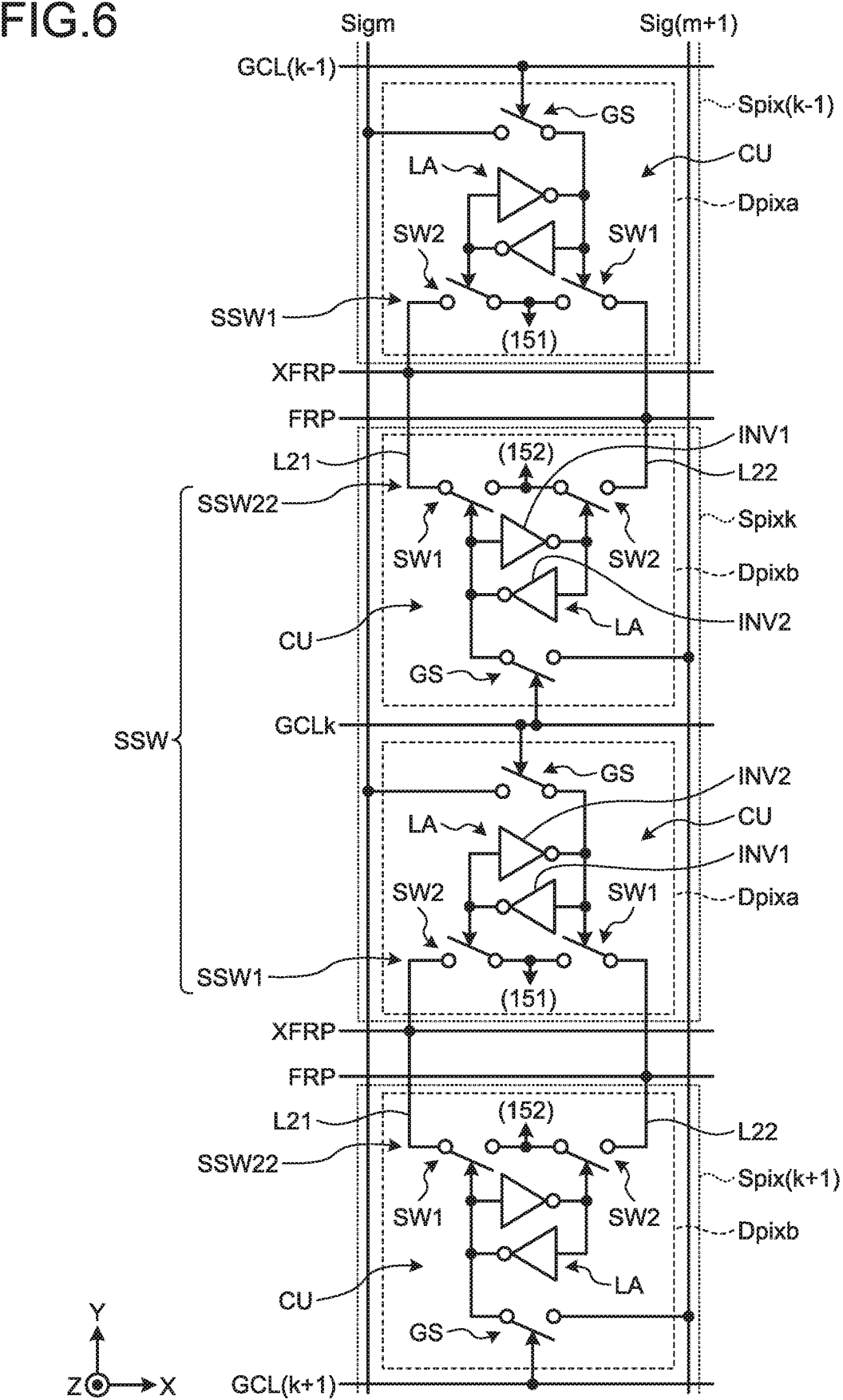
FIG. 6 is a diagram illustrating another example of the circuit configuration of the first divided pixels and the second divided pixels arranged in the Y-direction.

FIG. 6 is a diagram illustrating another example of the circuit configuration of the first divided pixels Dpixa and the second divided pixels Dpixb arranged in the Y-direction. Unlike in FIG. 5, in the circuit configuration illustrated in FIG. 6, wiring L21 extending from one end of the switch SW1 included in a second selection switch circuit SSW22 serving as the selection switch SSW of the second divided pixel Dpixb is coupled to the second potential line XFRP. Unlike in FIG. 5, in the configuration illustrated in FIG. 6, wiring L22 extending from one end of the switch SW2 of the second divided pixel Dpixb is coupled to the first potential line FRP. In other words, in the second divided pixel Dpixb of the circuit configuration illustrated in FIG. 6, the potential line to be coupled to the pixel electrode 152 in accordance with the pixel signal held in the latch circuit LA is reversed from that of FIG. 5. More specifically, the state of coupling between the first and second display signals corresponding to the pixel signal held by the latch circuit LA and the pixel electrodes 151 and 152 is reversed between the first divided pixel Dpixa and the second divided pixel Dpixb. In other words, when the switches SW1 are controlled to be on and the switches SW2 are controlled to be off, the first potential line FRP is coupled to the pixel electrodes 151 and 152 of the first divided pixel Dpixa and the second divided pixel Dpixb in FIG. 5, whereas the first divided pixel Dpixa is coupled to the first potential line FRP and the second divided pixel Dpixb is coupled to the second potential line XFRP in the configuration of FIG. 6. As a result, although the latch circuits LA hold the same pixel signal, the display in the sub-pixels Spix is reversed between the first divided pixel Dpixa and the second divided pixel Dpixb. As a result, for example, even when full-white display is intended, the second divided pixel Dpixb displays an opposite color, black.

The circuit configuration illustrated in FIG. 6 can more easily miniaturize the first divided pixel Dpixa and the second divided pixel Dpixb than the circuit configuration illustrated in FIG. 5 in that the crossing portion CR is not formed. However, as described above, in the second divided pixel Dpixb of the circuit configuration illustrated in FIG. 6, the potential line to be coupled to the pixel electrode 152 in accordance with the pixel signal held in the latch circuit LA is reversed from that of FIG. 5. Therefore, the circuit configuration illustrated in FIG. 6 is employed in conjunction with a mechanism for compensating the reversal of the combination.

Figure 7:
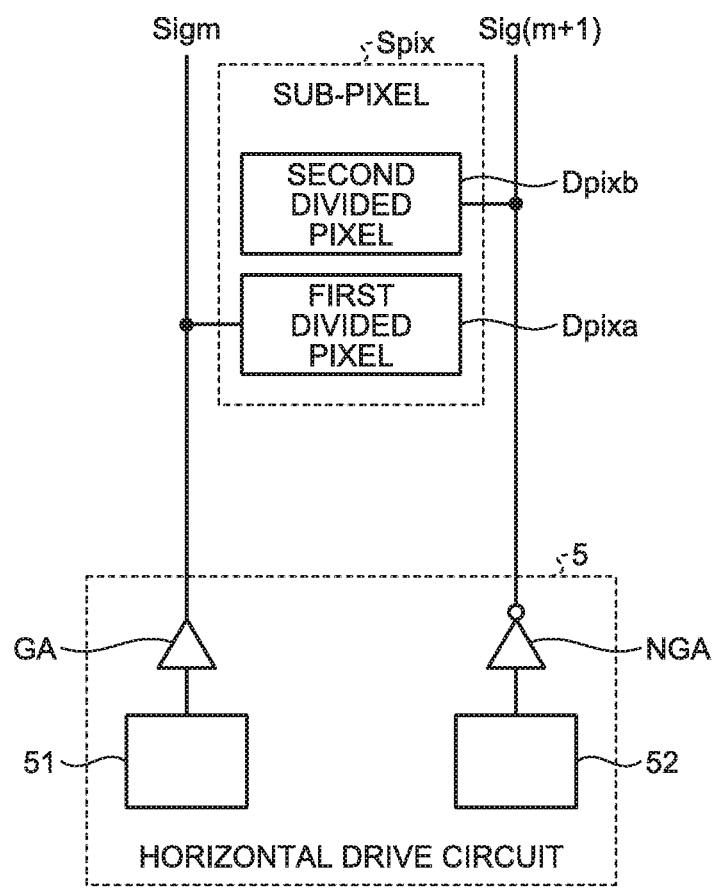
FIG. 7 is a diagram illustrating an example of a configuration of inverting a pixel signal to the second divided pixels.

FIG. 7 is a diagram illustrating an example of a configuration of inverting the pixel signal to the second divided pixel Dpixb before being supplied to the latch circuit LA. The horizontal drive circuit 5 illustrated in FIG. 7 includes a first intermediate circuit 51, a second intermediate circuit 52, a transmitter GA, and a signal inverter NGA.

The first intermediate circuit 51 receives the pixel signal output from the first register 41 and outputs the received pixel signal to the transmitter GA. The second intermediate circuit 52 receives the pixel signal output from the second register 42 and outputs the received pixel signal to the signal inverter NGA. The transmitter GA transmits the received signal as it is to the signal line Sigm. The transmitter GA need not be provided. In other words, the first intermediate circuit 51 may directly transmit the pixel signal output from the first register 41 to the signal line Sigm. The signal inverter NGA inverts the signal from the second intermediate circuit 52 and transmits the result to the signal line Sig(m+1). This operation converts the pixel signal to be transmitted to the second divided pixel Dpixb into a signal inverted between 0 and 1. With this configuration, the second divided pixel Dpixb in FIG. 6 can normally operate, which would otherwise perform the reversed operation when being supplied with the non-inverted pixel signal.

More specifically, for example, when the full-white display is performed, that is, when the first divided pixel Dpixa and the second divided pixel Dpixb in the same sub-pixel Spix performs the same display, the first intermediate circuit 51 receives the pixel signal (for example, 1) output from the first register 41 and outputs the received pixel signal to the transmitter GA. The transmitter GA transmits the received signal as it is to the signal line Sigm. The pixel signal is supplied to the latch circuit LA of the first divided pixel Dpixa and is held in there. The pixel signal controls the switches SW1 and SW2 of the first selection switch circuit SSW1. Since the pixel signal is 1, the switch SW1 is controlled to be off, and the switch SW2 is controlled to be on. This operation couples the second potential line XFRP to the pixel electrode 151 and then supplies an inverted display signal to the pixel electrode 151. As a result, the first divided pixel Dpixa displays white.

The second intermediate circuit 52 receives the pixel signal (for example, 1) output from the second register 42 and outputs the received pixel signal to the signal inverter NGA. The signal inverter NGA inverts the received signal, that is, inverts the pixel signal from 1 to 0, and transmits the result to the signal line Sig(m+1). The inverted pixel signal is supplied to the latch circuit LA of the second divided pixel Dpixb and is held in there. The inverted pixel signal controls the switches SW1 and SW2 of the second selection switch circuit SSW22. Since the inverted pixel signal is 0, the switch SW1 is controlled to be on, and the switch SW2 is controlled to be off. The wiring L21 from the switch SW1 is coupled to the second potential line XFRP, and the wiring L22 from the switch SW2 is coupled to the first potential line FRP. Therefore, also in this pixel circuit CU, the second potential line XFRP is coupled to the pixel electrode 152, and the inverted display signal is supplied to the pixel electrode 152. As a result, the second divided pixel Dpixb displays white.

As a result, the configuration of FIG. 6 also achieves the full-white display.

Figure 8:
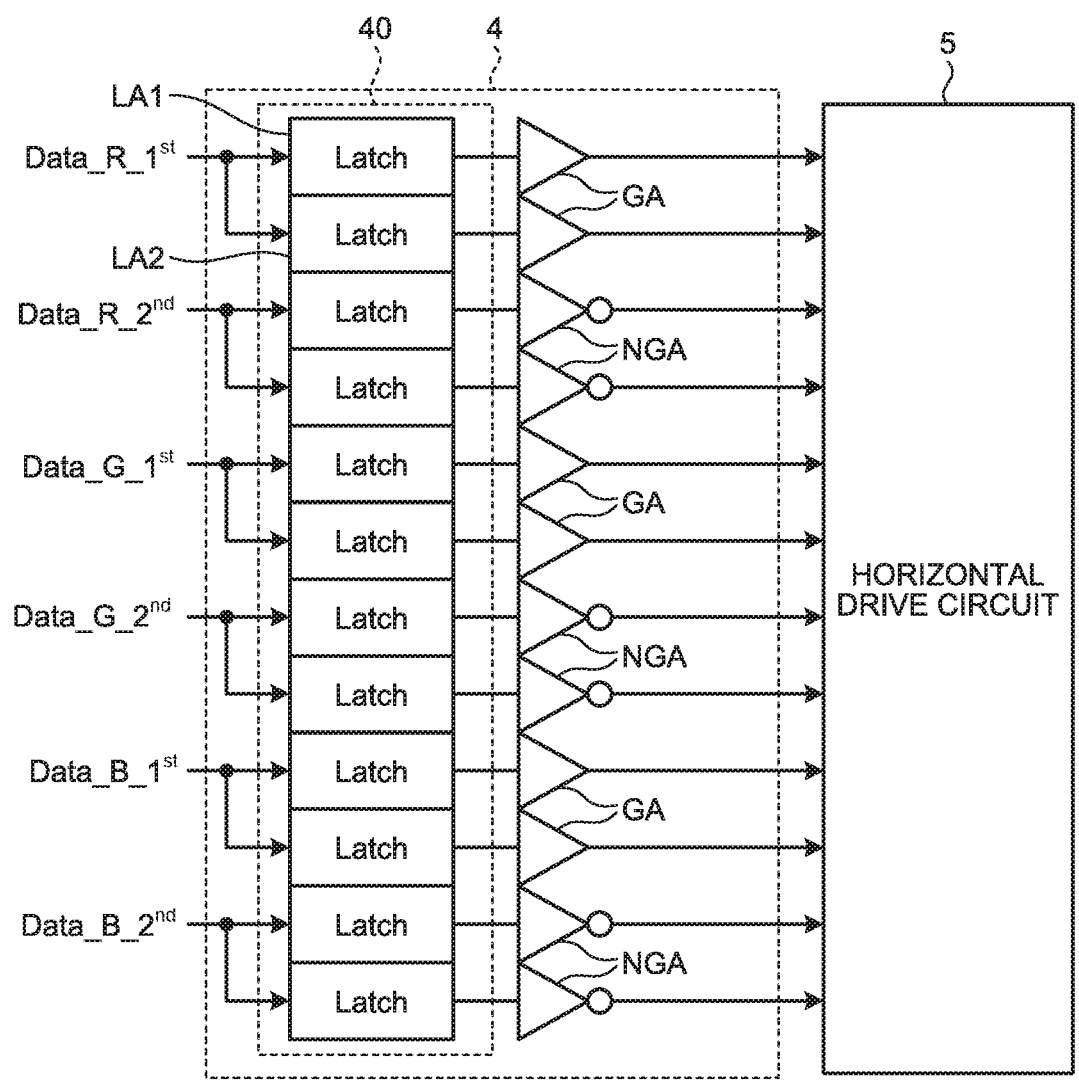
FIG. 8 is a diagram illustrating another example of the configuration of inverting the pixel signal to the second divided pixels.

FIG. 8 is a diagram illustrating another example of the configuration of inverting the pixel signal to the second divided pixel Dpixb. The register 40 illustrated in FIG. 8 includes the signal inverter NGA that inverts the pixel signals of Data_R_$2^{nd}$, Data_G_$2^{nd}$, and Data_B_$2^{nd}$ and outputs the results.

The configuration illustrated in FIG. 8 is a configuration in which, for each of Data_R_$1^{st}$, Data_R_$2^{nd}$, Data_G_$1^{st}$, Data_G_$2^{nd}$, Data_B_$1^{st}$, and Data_B_$2^{nd}$, the input thereof is divided into an odd-numbered pixel signal and an even-numbered pixel signal, and the odd-numbered pixel signal is held by a latch circuit LA1 and the even-numbered pixel signal is held by a latch circuit LA2. This configuration can divide the output timing of the odd-numbered pixel signals from that of the even-numbered pixel signals. Accordingly, the number of the pixel signals to be simultaneously handled by the horizontal drive circuit 5 can be reduced, so that processing load and required performance (drive frequency of the circuit) of the horizontal drive circuit 5 can be reduced.

Of the latch circuits illustrated in FIG. 8, those for receiving the input of Data_R_$1^{st}$, Data_G_$1^{st}$, and Data_B_$1^{st}$ serve as the first register 41, and those for receiving the input of Data_R_$2^{nd}$, Data_G_$2^{nd}$, and Data_B_$2^{nd}$ serve as the second register 42.

Figure 9:
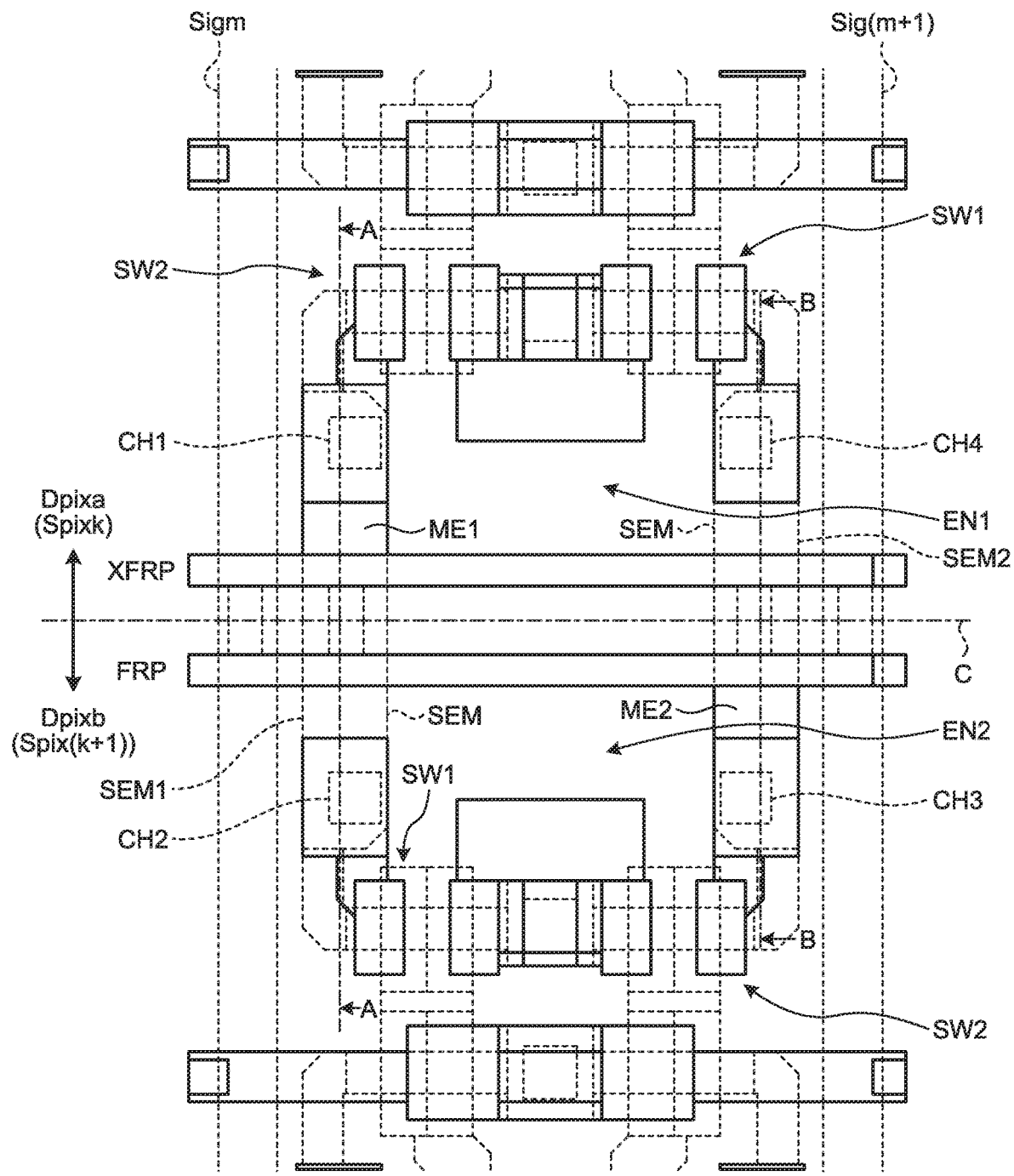
FIG. 9 is a plan view illustrating an example of a structure stacked with a first divided pixel Dpixa and a second divided pixel Dpixb facing each other with a first potential line and a second potential line interposed therebetween.
Figure 10:
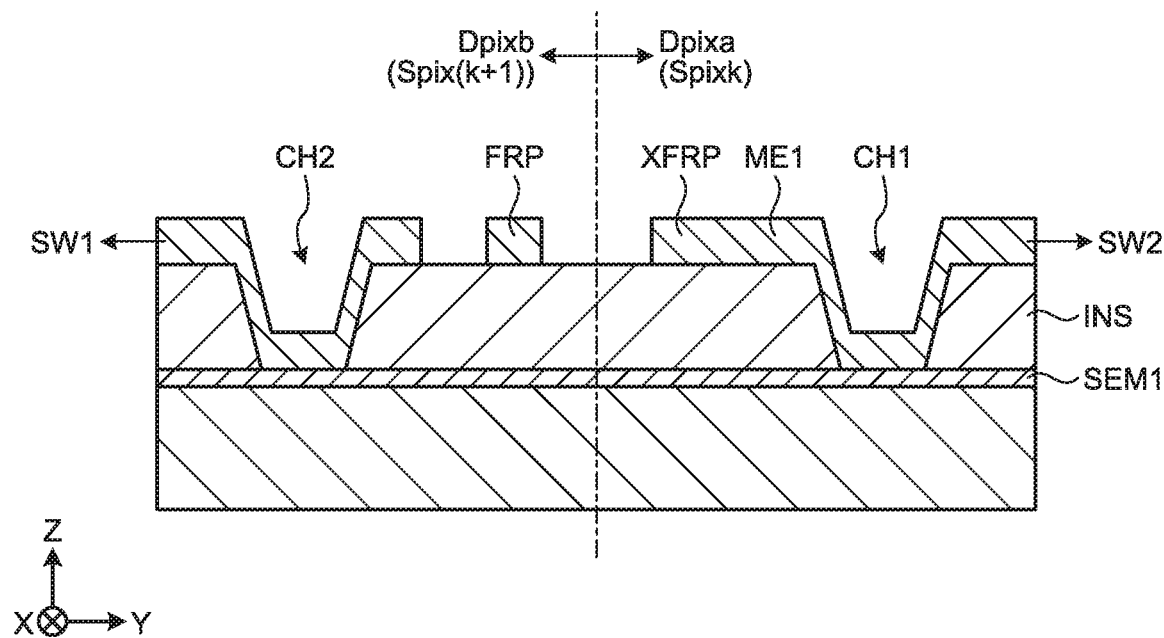
FIG. 10 is an A-A sectional view of FIG. 9.
Figure 11:
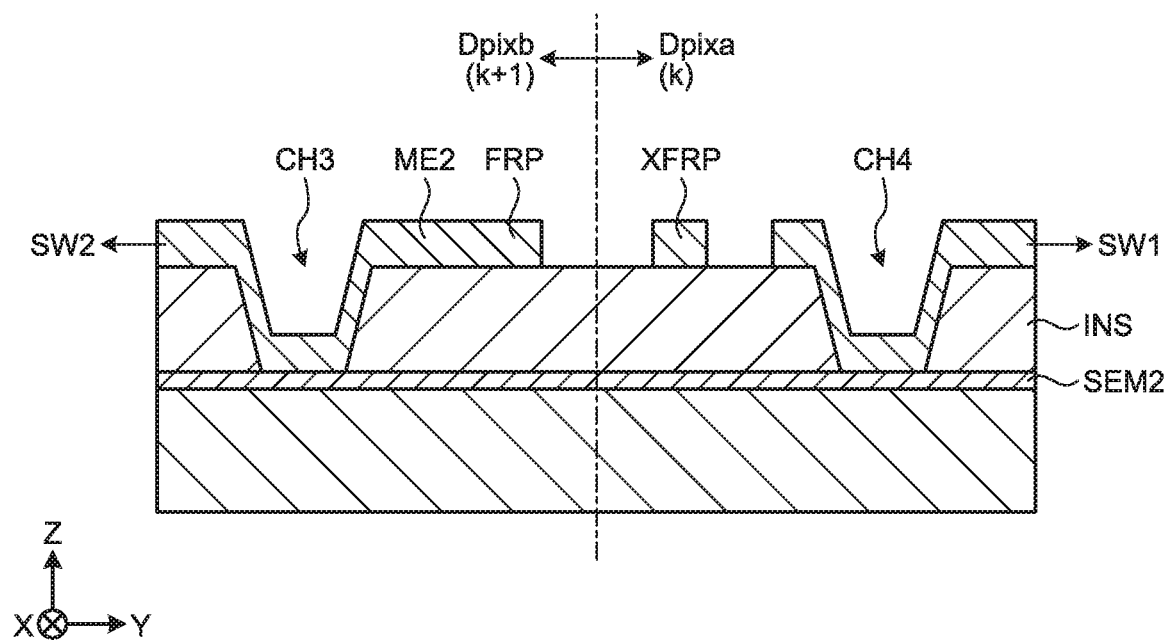
FIG. 11 is a B-B sectional view of FIG. 9.

FIG. 9 is a plan view illustrating an example of a structure stacked with the first divided pixel Dpixa and the second divided pixel Dpixb facing each other with the first potential line FRP and the second potential line XFRP interposed therebetween. FIG. 10 is an A-A sectional view of FIG. 9. FIG. 11 is a B-B sectional view of FIG. 9. The configuration illustrated in FIGS. 9 to 11 corresponds to the circuit configuration illustrated in FIG. 6.

FIGS. 9 and 10 illustrate a relation between the second potential line and the switches. As illustrated in FIGS. 9 and 10, On a side of the first divided pixel Dpixa of the sub-pixel Spixk, metal wiring ME1 extends from the second potential line XFRP toward the switch SW2. The metal wiring ME1 is coupled to intermediate wiring SEM1 through a contact hole CH1. The metal wiring ME1 is coupled to one end of the switch SW2 included in the first divided pixel Dpixa disposed with the contact hole CH1 interposed therebetween.

On a side of the second divided pixel Dpixb of the sub-pixel Spix(k+1), one end of the switch SW1 is coupled to the intermediate wiring SEM1 through a contact hole CH2. The switch SW1 included in the second divided pixel Dpixb is coupled to the second potential line XFRP through the contact hole CH2, the intermediate wiring SEM1, the contact hole CH1, and the metal wiring ME1. This configuration causes the switch SW2 included in the first divided pixel Dpixa of the sub-pixel Spixk and the switch SW1 included in the second divided pixel Dpixb of the sub-pixel Spix(k+1) to be coupled to the second potential line XFRP.

FIGS. 9 and 11 illustrate a relation between the first potential line FRP and the switches. As illustrated in FIGS. 9 and 11, on a side of the second divided pixel Dpixb of the sub-pixel Spix(k+1), metal wiring ME2 extends from the first potential line FRP toward the switch SW2. The metal wiring ME2 is coupled to intermediate wiring SEM2 through a contact hole CH3. The metal wiring ME2 is coupled to one end of the switch SW2 included in the second divided pixel Dpixb disposed with the contact hole CH3 interposed therebetween.

On a side of the first divided pixel Dpixa of the sub-pixel Spixk, one end of the switch SW1 is coupled to the intermediate wiring SEM2 through a contact hole CH4. The switch SW1 is coupled to the first potential line FRP through the contact hole CH4, the intermediate wiring SEM2, the contact hole CH3, and the metal wiring ME2. This configuration causes the switch SW2 included in the second divided pixel Dpixb of the sub-pixel Spix(k+1) and the switch SW1 included in the first divided pixel Dpixa of the sub-pixel Spixk to be coupled to the first potential line FRP.

The contact holes CH1, CH2, CH3, and CH4 are provided in an insulating layer INS insulating a metal wiring layer including the first potential line FRP, the second potential line XFRP, and the metal wiring ME1 and ME2 from intermediate wiring including the intermediate wiring SEM1 and SEM2, and couple the metal wiring layer to the intermediate wiring. The intermediate wiring SEM1 is electrically independent from the intermediate wiring SEM2. The intermediate wiring lies in the same layer as a layer including semiconductors included in, for example, the switches SW1 and SW2.

As described above, with the configuration that uses the intermediate wiring SEM1 and the intermediate wiring SEM2 to share the second potential line XFRP and the first potential line FRP, the circuit configuration can be obtained with a smaller number of layers than in a case of using a dedicated wiring layer for sharing the second potential line XFRP and the first potential line FRP. Since the crossing portion CR is not formed in a locally biased manner, the pixel circuit CU of the first divided pixel Dpixa and the pixel circuit CU of the second divided pixel Dpixb can be substantially line-symmetrically arranged with respect to a center line C (refer to FIG. 9). Alternatively, the pixel circuits CU can be point-symmetrically arranged. As a result, a higher definition can be obtained. The pixel circuits CU can be easily balanced in capacity, and the increase in definition is restrained from causing defective display.

As described above, the display device of the present embodiment includes the first divided pixel Dpixa, the second divided pixel Dpixb, the signal line Sigm extending in the Y-direction and coupled to the first divided pixel Dpixa, the signal line Sig(m+1) extending in the Y-direction and coupled to the second divided pixel Dpixb, and the scan line GCL extending in the X-direction and coupled to the first divided pixel Dpixa and the second divided pixel Dpixb. This configuration allows the first divided pixel Dpixa and the second divided pixel Dpixb to share the scan line GCL. Accordingly, the display device 1 capable of operating with a smaller number of the scan lines GCL can be provided.

The display device of the present embodiment also includes the first potential line FRP extending in the X-direction and supplied with a first potential corresponding to a first gradation (for example, the black display) of the first divided pixel Dpixa and the second divided pixel Dpixb, and includes the second potential line XFRP extending in the X-direction and supplied with a second potential corresponding to a second gradation (for example, the white display) of the first divided pixel Dpixa and the second divided pixel Dpixb. The pixel electrode 15 included in each of the first divided pixel Dpixa and the second divided pixel Dpixb is supplied with either one of the first potential or the second potential. The sub-pixels Spix each including the first divided pixel Dpixa and the second divided pixel Dpixb are arranged in the Y-direction. The first potential line FRP and the second potential line XFRP are disposed between two of the sub-pixels Spix adjacent in the Y-direction. This configuration can individually control the first divided pixel Dpixa and the second divided pixel Dpixb between the two gradations.

The sub-pixel Spixk is adjacent to the sub-pixel Spix(k+1) in the Y-direction. The first divided pixel Dpixa included in the sub-pixel Spixk and the second divided pixel Dpixb included in the sub-pixel Spix(k+1) share the first potential line FRP and the second potential line XFRP disposed between the sub-pixel Spixk and the sub-pixel Spix(k+1). This configuration allows smaller numbers of the first potential lines FRP and the second potential lines XFRP to achieve the two-gradation control.

The pixel signals supplied through the signal line Sigm and the signal line Sig(m+1) to the first divided pixel Dpixa and the second divided pixel Dpixb are each the one-bit signal. Each of the first divided pixel Dpixa and the second divided pixel Dpixb includes the switches SW1 or SW2 either of which couples the pixel electrode 15 to the first potential line FRP or the second potential line XFRP in accordance with the one-bit signal. The potential line (the first potential line FRP or the second potential line XFRP) to be coupled to the pixel electrode 15 of the first divided pixel Dpixa and the potential line (the first potential line FRP or the second potential line XFRP) to be coupled to the pixel electrode 15 of the second divided pixel Dpixb are opposite to each other with respect to the one-bit signals having the same value. The one-bit signal supplied to either one of the signal line Sigm or the signal line Sig(m+1) is a signal obtained by inverting the externally received bit value. This configuration can restrain the crossing portion CR from being formed.

The display device of the present embodiment also includes the interface circuit 4 that outputs the pixel signals supplied through the signal line Sigm and the signal line Sig(m+1) to the first divided pixel Dpixa and the second divided pixel Dpixb. The interface circuit 4 includes the register 40 including the first register 41 for storing therein the pixel signal to be supplied to the first divided pixel Dpixa and the second register 42 for storing therein the pixel signal to be supplied to the second divided pixel Dpixb. This configuration can individually handle the pixel signal to be supplied to the first divided pixel Dpixa and the pixel signal to be supplied to the second divided pixel Dpixb.

The interface circuit 4 performs serial-to-parallel conversion to divide a serial signal externally received and including the pixel signals into pixel signals for the register 41 and pixel signals for the second register 42 and store the divided pixel signals in the first register 41 and the second register 42, respectively. As a result, although the pixel signals are based on the input signal IP received as the serial signal, the pixel signal to be supplied to the first divided pixel Dpixa and the pixel signal to be supplied to the second divided pixel Dpixb can be individually handled.

As illustrated in FIG. 8, since the register 40 includes the signal inverter NGA that inverts the pixel signal stored in one of the first register 41 and the second register 42 (for example, the second register 42), only the pixel signal from one of the first register 41 and the second register 42 can be inverted.

As illustrated in FIG. 7, the horizontal drive circuit 5 includes the signal inverter NGA that inverts the pixel signal to be supplied to one of the signal line Sigm and the signal line Sig(m+1), and the horizontal drive circuit 5 is interposed between the interface circuit 4 and the signal lines Sig. Therefore, only the pixel signal to be supplied to one of the signal line Sigm and the signal line Sig(m+1) can be inverted.

In the example illustrated in FIG. 3, the length in the Y-direction of the second divided pixels R12, G12, and B12 is greater than the length in the Y-direction of the first divided pixels R11, G11, and B11. However, this is merely an example of a specific aspect for causing the area ratio between first divided pixel Dpixa and the second divided pixel Dpixb to be 1:2. The shapes and sizes of the first divided pixel Dpixa and the second divided pixel Dpixb are not limited to the example. For example, the second divided pixel Dpixb may have two openings each having the same size as that of the first divided pixel Dpixa. In that case, the second divided pixel Dpixb includes two pixel electrodes 151 having the same shape and size as those of the pixel electrode 151 included in the first divided pixel Dpixa. The two pixel electrodes 151 are coupled together to have the same potential.

The area ratio between the first divided pixel Dpixa and the second divided pixel Dpixb is not limited to 1:2 and can be changed as appropriate. Although the description with reference to FIGS. 6 to 8 assumes that the bit of the pixel signal for the second divided pixel Dpixb is inverted, the bit of the pixel signal for the first divided pixel Dpixa may be inverted. In that case, the arrangement of the transmitter GA and the signal inverter NGA is reversed so as to be able to invert the pixel signal stored in the first register 41 and output the inverted pixel signal to the signal line Sigm.

The example described above has illustrated the configuration in which the first divided pixel Dpixa of the sub-pixel Spixk and the second divided pixel Dpixb of the sub-pixel Spix(k+1) arranged in the Y-direction share the first potential line FRP and the second potential line XFRP. However, a configuration can also be employed in which the first divided pixel Dpixa and the second divided pixel Dpixb in the same sub-pixel Spix share the first potential line FRP and the second potential line XFRP. In this case, the first divided pixel Dpixa of the sub-pixel Spixk and the second divided pixel Dpixb of the sub-pixel Spix(k+1) arranged in the Y-direction share the scan line GCL.

Other operational advantages accruing from the aspects described in the embodiment herein that are obvious from the description herein, or that are appropriately conceivable by those skilled in the art will naturally be understood as accruing from the present invention.

What is claimed is:

1. A display device comprising:
   two pixels having different areas;
   a first signal line extending in an arrangement direction of the two pixels and coupled to one of the two pixels;
   a second signal line extending in the arrangement direction and coupled to the other of the two pixels; and
   a scan line extending between the two pixels in an intersection direction intersecting the arrangement direction and coupled to the two pixels,
   a first potential line extending in the intersection direction and configured to be supplied with a first potential; and
   a second potential line extending in the intersection direction and configured to be supplied with a second potential,
   wherein each of the two pixels includes a pixel electrode configured to be supplied with either one of the first potential and the second potential,
   wherein a plurality of unit pixels each including the two pixels are arranged in the arrangement direction, and
   wherein the first potential line and the second potential line are disposed between two of the unit pixels adjacent in the arrangement direction,
   wherein each of the two pixels is supplied with a signal through a corresponding one of the first signal line and the second signal line, and the signal is a one-bit signal,
   wherein each of the two pixels comprises a switching circuit configured to couple the pixel electrode to the first potential line or the second potential line in accordance with the one-bit signal,
   wherein the switching circuit included in one of the two pixels and the switching circuit included in the other of the two pixels are configured such that the potential line to be coupled to the pixel electrode of the one pixel and the potential line to be coupled to the pixel electrode of the other pixel are opposite to each other with respect to the one-bit signals having the same value, and
   wherein the one-bit signal to be supplied to one of the first signal line and the second signal line is a signal obtained by inverting an externally received bit value.

2. The display device according to claim 1,
   wherein one of the two pixels included in one of the two unit pixels adjacent in the arrangement direction and the other of the two pixels included in the other of the two unit pixels adjacent in the arrangement direction share the first potential line and the second potential line disposed between the two unit pixels.

3. The display device according to claim 1, further comprising a signal output circuit configured to output the one-bit signals supplied to the two pixels through the first signal line and the second signal line,
   wherein the signal output circuit comprises a storage comprising a first storage area configured to store the one-bit signal to be supplied to one of the two pixels and a second storage area configured to store the one-bit signal to be supplied to the other of the two pixels.

4. The display device according to claim 3,
   wherein the signal output circuit is configured to perform serial-to-parallel conversion to divide a serial signal externally received including a plurality of the one-bit signals into a signal for the first storage area and a signal for the second storage area, and store the divided signals in the first storage area and the second storage area, respectively.

5. The display device according to claim 3,
   wherein the signal output circuit comprises an inverter configured to invert the one-bit signal, and
   wherein the inverter is configured to invert the one-bit signal stored in one of the first storage area and the second storage area.

6. The display device according to claim 3,
   wherein the signal output circuit comprises an inverter configured to invert the one-bit signal, and is configured to perform serial-to-parallel conversion to divide a serial signal externally received including a plurality of the one-bit signals into a signal for the first storage area and a signal for the second storage area, and store the divided signals in the first storage area and the second storage area, respectively, and
   wherein the inverter is configured to invert the one-bit signal stored in one of the first storage area and the second storage area.

7. The display device according to claim 3, further comprising a circuit comprising an inverter configured to invert the one-bit signal to be supplied to one of the first signal line and the second signal line,
   wherein the circuit is interposed between the signal output circuit and the first and second signal lines.

8. The display device according to claim 3, further comprising a circuit comprising an inverter configured to invert the one-bit signal to be supplied to one of the first signal line and the second signal line,
   herein the signal output circuit is configured to perform serial-to-parallel conversion to divide a serial signal externally received including a plurality of the one-bit signals into a signal for the first storage area and a signal for the second storage area, and store the divided signals in the first storage area and the second storage area, respectively, and
   wherein the circuit is interposed between the signal output circuit and the first and second signal lines.

9. A display device comprising:
a first potential line configured to supply a first display signal;
a second potential line configured to supply a second display signal; and
first and second pixels configured to receive the signals supplied from the first and second potential lines to display an image,
wherein the first pixel comprises
a first pixel electrode,
a first latch circuit configured to hold a pixel signal, and
a first selection switch circuit configured to couple either one of the first potential line and the second potential line to the first pixel electrode in accordance with the pixel signal that is output from the first latch circuit,
wherein the second pixel comprises
a second pixel electrode,
a second latch circuit configured to hold a pixel signal, and
a second selection switch circuit configured to couple either one of the first potential line and the second potential line to the second pixel electrode in accordance with the pixel signal that is output from the second latch circuit, and
wherein the first selection switch circuit and the second selection switch circuit are configured such that a potential line to be coupled to the first pixel electrode and a potential line to be coupled to the second pixel electrode are opposite to each other with respect to the pixel signals having the same value.

10. The display device according to claim 9,
wherein each of the first and second latch circuits is configured to hold a positive or negative pixel signal, and
wherein the first selection switch circuit is configured to couple the second potential line to the first pixel electrode when the positive pixel signal is output from the first latch circuit, and the second selection switch circuit is configured to couple the first potential line to the second pixel electrode when the positive pixel signal is output from the second latch circuit.

11. The display device according to claim 9, further comprising:
a signal supply circuit configured to supply signals to respective pixels;
a first signal line coupled to the signal supply circuit and configured to supply a pixel signal to the first latch circuit;
a second signal line coupled to the signal supply circuit and configured to supply a pixel signal to the second latch circuit; and
a signal inverter provided between the signal supply circuit and the second latch circuit and configured to invert and output the pixel signal that is output from the signal supply circuit.

* * * * *